(12) United States Patent
Cocchi et al.

(10) Patent No.: US 10,556,258 B2
(45) Date of Patent: Feb. 11, 2020

(54) METHOD FOR CLEANING A MACHINE FOR LIQUID OR SEMI-LIQUID FOOD PRODUCTS

(71) Applicant: ALI GROUP S.r.l.-CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.-CARPIGIANI, Cernusco Sul (IT)

( * ) Notice: Subject to any disclaimer, the term of this patent is extended or adjusted under 35 U.S.C. 154(b) by 0 days.

(21) Appl. No.: 14/687,272

(22) Filed: Apr. 15, 2015

(65) Prior Publication Data

US 2015/0306639 A1 Oct. 29, 2015

(30) Foreign Application Priority Data

Apr. 24, 2014 (IT) .............................. BO2014A0237

(51) Int. Cl.
| | | |
|---|---|---|
| *A23G 9/30* | (2006.01) | |
| *B08B 9/08* | (2006.01) | |
| *A23C 7/02* | (2006.01) | |

(52) U.S. Cl.
CPC .................. *B08B 9/08* (2013.01); *A23C 7/02* (2013.01); *A23G 9/30* (2013.01); *B08B 9/0804* (2013.01)

(58) Field of Classification Search
CPC ...................................................... A23G 9/30
See application file for complete search history.

(56) References Cited

U.S. PATENT DOCUMENTS 2,784,565 A 3/1957 Stalkup et al.
2,961,853 A 11/1960 Cohrt et al.
(Continued)

FOREIGN PATENT DOCUMENTS

CN 1388854 A 1/2003
CN 2621434 Y 6/2004
(Continued)

OTHER PUBLICATIONS

Italian Search Report dated Nov. 11, 2014 from counterpart app No. BO20140237.
(Continued)

*Primary Examiner* — Mikhail Kornakov
*Assistant Examiner* — Ryan L. Coleman
(74) *Attorney, Agent, or Firm* — Shuttleworth & Ingersoll, PLC; Timothy J. Klima

(57) ABSTRACT

A method for cleaning a machine for liquid or semi-liquid food products having a container forming a processing chamber, a mixer inside the processing chamber, and a thermal treatment mechanism to exchange heat with the processing chamber. The method includes a) pasteurizing a basic mixture or finished product in the container at a first time interval; b) performing the following operations at a second time interval: emptying the basic mixture from the container, washing the container using a washing fluid, filling the container with a cleaning fluid and subjecting the cleaning fluid in the container to a heating thermal treatment; c) disassembling and cleaning at a third time interval components of the machine which make contact, in use, with the basic mixture or product, where the first time interval is less than the second time interval and the second time interval is less than the third time interval.

7 Claims, 2 Drawing Sheets

(56) References Cited

U.S. PATENT DOCUMENTS

| | | | |
|---|---|---|---|
| 2,975,617 A | 3/1961 | Wakeman et al. | |
| 3,029,613 A | 4/1962 | Lande | |
| 3,729,177 A * | 4/1973 | Keyes | A23G 9/30 134/132 |
| 3,811,494 A | 5/1974 | Menzel | |
| 3,829,242 A | 8/1974 | Duke et al. | |
| 3,898,859 A | 8/1975 | Duke | |
| 3,930,535 A * | 1/1976 | Menzel | A23G 9/20 165/254 |
| 3,989,492 A | 11/1976 | Keyes | |
| 4,479,423 A | 10/1984 | Schwitters et al. | |
| 4,522,041 A | 6/1985 | Menzel | |
| 4,607,494 A | 8/1986 | Cipelletti | |
| 4,625,525 A | 12/1986 | Bradbury et al. | |
| 4,680,944 A | 7/1987 | Menzel | |
| 4,703,628 A | 11/1987 | Togashi et al. | |
| 4,848,381 A | 7/1989 | Livingston et al. | |
| 4,860,550 A | 9/1989 | Aoki et al. | |
| 4,964,542 A | 10/1990 | Smith | |
| 5,016,446 A | 5/1991 | Fiedler | |
| 5,201,861 A | 4/1993 | Menzel | |
| 5,447,371 A * | 9/1995 | Agapiou | A23G 9/045 366/149 |
| 5,503,064 A | 4/1996 | Scheel et al. | |
| 5,615,559 A | 4/1997 | Kress et al. | |
| 5,692,392 A | 12/1997 | Swier | |
| 5,799,832 A | 9/1998 | Mayo | |
| 5,962,035 A | 10/1999 | Masse et al. | |
| 6,142,340 A | 11/2000 | Watanabe et al. | |
| 6,189,440 B1 | 2/2001 | Amundson | |
| 6,490,872 B1 | 12/2002 | Beck et al. | |
| 6,494,055 B1 | 12/2002 | Meserole et al. | |
| 7,640,755 B1 | 1/2010 | Kateman | |
| 7,681,761 B2 | 3/2010 | Harra | |
| 8,316,761 B2 | 11/2012 | Bravo et al. | |
| 8,758,678 B2 | 6/2014 | Cocchi et al. | |
| 9,402,408 B2 | 8/2016 | Cocchi et al. | |
| 9,693,571 B2 | 7/2017 | Cocchi et al. | |
| 2002/0162577 A1 | 11/2002 | Cocchi | |
| 2004/0003620 A1 | 1/2004 | Cocchi et al. | |
| 2004/0035640 A1 | 2/2004 | Barnard et al. | |
| 2004/0251270 A1 | 12/2004 | Davis et al. | |
| 2005/0098575 A1 * | 5/2005 | Carhuff | A47J 31/401 221/150 R |
| 2005/0103213 A1 | 5/2005 | Dumm | |
| 2005/0269362 A1 | 12/2005 | Guerrero et al. | |
| 2006/0024418 A1 | 2/2006 | White et al. | |
| 2006/0185755 A1 * | 8/2006 | Vaughn, Jr. | B67C 3/005 141/89 |
| 2006/0240159 A1 | 10/2006 | Cash et al. | |
| 2006/0243310 A1 | 11/2006 | Cocchi et al. | |
| 2006/0261086 A1 | 11/2006 | Schroeder et al. | |
| 2007/0102448 A1 * | 5/2007 | Harra | A23G 9/20 222/146.6 |
| 2007/0114228 A1 | 5/2007 | Cocchi et al. | |
| 2007/0275131 A1 | 11/2007 | Bertini et al. | |
| 2008/0295865 A1 | 12/2008 | Ahn | |
| 2010/0101235 A1 | 4/2010 | Cocchi et al. | |
| 2012/0251697 A1 | 10/2012 | Cocchi et al. | |
| 2013/0064034 A1 | 3/2013 | Almblad et al. | |
| 2013/0140328 A1 * | 6/2013 | Gates | A47J 31/60 222/148 |
| 2014/0335232 A1 | 11/2014 | Beth Halachmi | |
| 2015/0245634 A1 | 9/2015 | Lazzarini et al. | |

FOREIGN PATENT DOCUMENTS

| | | |
|---|---|---|
| CN | 1780785 A | 5/2006 |
| CN | 101175412 A | 5/2008 |
| CN | 101263838 A | 9/2008 |
| CN | 101790319 A | 7/2010 |
| CN | 102726590 A | 10/2012 |
| EP | 0729707 A2 | 9/1996 |
| EP | 2279669 A2 | 2/2011 |
| EP | 2491792 A1 | 8/2012 |
| JP | H02107160 A | 4/1990 |
| JP | H0690669 A | 4/1994 |
| JP | H06181732 A | 7/1994 |
| JP | 2001169729 A | 6/2001 |
| JP | 2002017268 A | 1/2002 |
| JP | 2006271221 A | 10/2006 |
| JP | 2006523459 A | 10/2006 |
| WO | WO121007 | 3/2001 |
| WO | 2004091324 A2 | 10/2004 |
| WO | WO2009027757 A1 | 3/2009 |
| WO | 2014003881 A1 | 1/2014 |

OTHER PUBLICATIONS

International Search Report and Written Opinion for related PCT Application No. PCT/IB2014/061586.
Italian Search Report dated Nov. 11, 2014 from related Italian Application No. 8020140236.
Chinese Office Action dated Apr. 4, 2018 from related Chinese Patent Application No. 201510312036.8.
English translation of Japanese Office Action dated Feb. 7, 2019 for counterpart Japanese Patent Application No. 2015085787.
English translation of Japanese Office Action dated Feb. 27, 2019 for related Japanese Patent Application No. JP 2015-085788.
Chinese Office Action dated Aug. 5, 2019 for counterpart Chinese Patent Application No. 201510297164.X.

* cited by examiner

METHOD FOR CLEANING A MACHINE FOR LIQUID OR SEMI-LIQUID FOOD PRODUCTS

This application claims priority to Italian Patent Application No. BO2014A000237 filed Apr. 24, 2014, which application is incorporated by reference herein.

BACKGROUND OF THE INVENTION

This invention relates to a method for cleaning a machine for liquid or semi-liquid food products (designed to produce in particular, but without restricting the scope of the invention, products of the soft ice cream or shake type).

As is known, this type of machine requires regular cleaning of the components which are in contact with the mixture or the finished product, in order to reduce the risk of formation of bacterial charge and increase the safety of the end product.

There is therefore a need felt by operators of cleaning the machine in an effective manner, guaranteeing a high food safety, and at the same time reducing the machine downtime, that is, reducing the unavailability of the machine.

SUMMARY OF THE INVENTION

The aim of this invention is therefore to provide a method for cleaning a machine for making liquid or semi-liquid products, in particular for soft ice cream or shake type products, which allows the above-mentioned needs to be met, that is, which guarantees a high food safety.

The aim of this invention is also to provide a method for cleaning a machine for making liquid or semi-liquid products which reduces the machine downtimes, that is, which reduces the unavailability of the machine.

Further, the aim of this invention is to provide a method for cleaning a machine for making liquid or semi-liquid products which reduces the quantity of cleaning fluids used.

These aims are achieved by a cleaning method according to which comprises technical features as set forth herein.

BRIEF DESCRIPTION OF THE DRAWINGS

The technical features of the invention, with reference to the above aims, are clearly described in the claims below and its advantages are apparent from the detailed description which follows, with reference to the accompanying drawing which illustrates a non-limiting example embodiment of the invention and in which:

DESCRIPTION OF THE PREFERRED EMBODIMENTS

Figure 1:
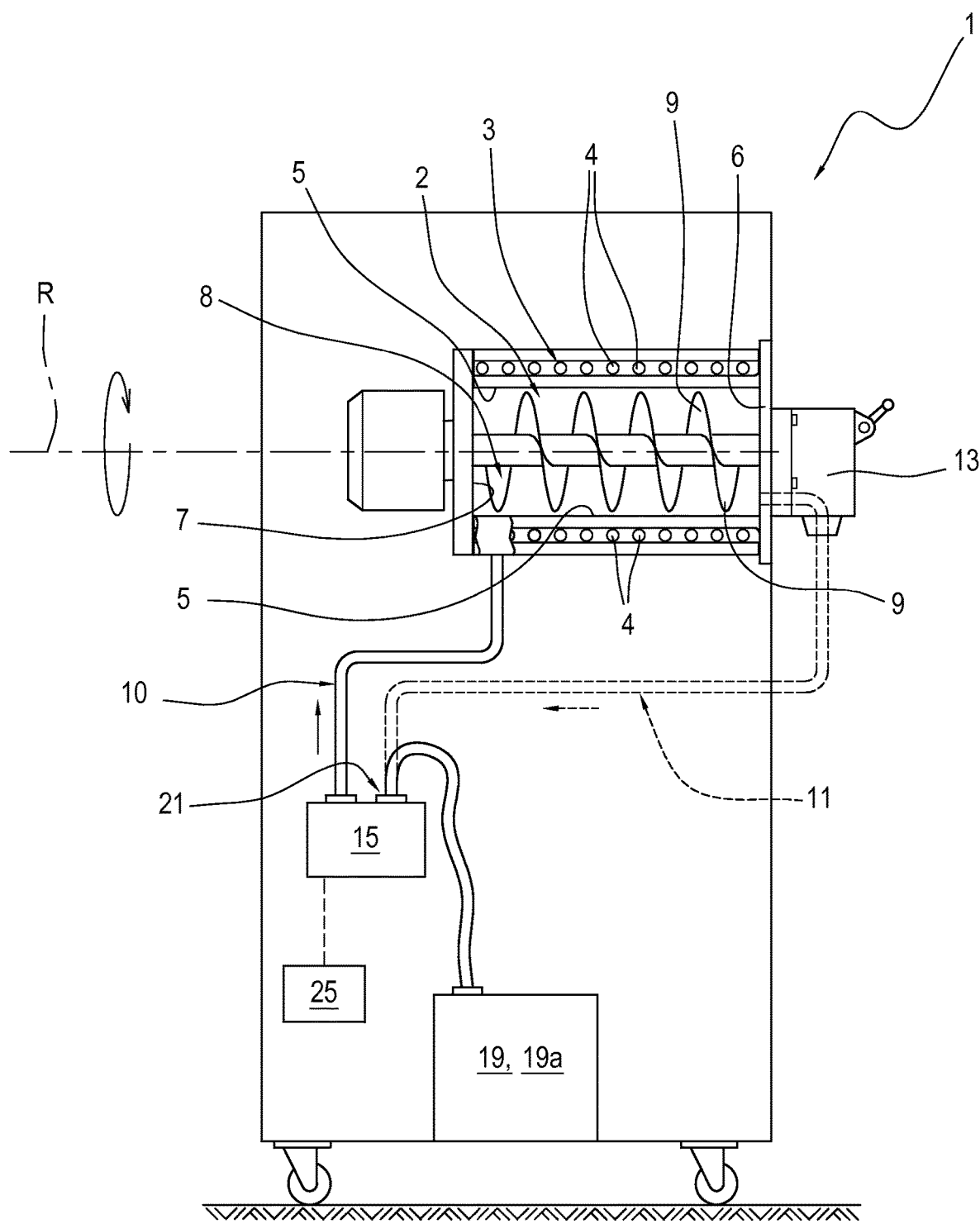
FIGS. 1 and 2 illustrate schematic side views of two different machines for making liquid or semi-liquid products in which the cleaning method according to this invention can be actuated.

With reference to the accompanying drawings, the numeral 1 denotes a machine for making liquid or semi-liquid products, in particular for products of the soft ice cream or shake type and the like.

Preferably, the machine 1 is used to make ice cream (or similar products) and, more specifically what is generally known as "soft ice cream".

The machine 1 comprises a container 2 (hereinafter also referred to as the cylinder 2) for containing and processing the basic products to convert the basic products into finished product, means 3 for thermal treatment (heating and/or cooling) of the cylinder 2 wrapped around at least part of the cylinder 2.

In the case of a machine for making ice cream, the cylinder 2 is a mixing and cooling cylinder intended to cool and mix the basic mixture to obtain a product of the ice cream type.

The heating and cooling means 3 comprise coils 4 in which a heat exchange fluid flows.

More precisely, the cylinder 2 has a leading end wall 6, a trailing end wall 7 and a perimeter side wall 5 joining the trailing end wall 7 to the leading end wall 6.

Preferably, the heating and cooling means 3 are wrapped around at least part of the side wall 5 of the cylinder 2.

The machine 1 comprises a mixer unit 8 positioned inside the cylinder 2 and able to mix the basic products while they are being processed.

The mixer unit 8 rotates about its axis of rotation R.

More specifically, the axis R is horizontal.

The mixer unit 8 (schematically illustrated in the accompanying drawings) is configured (that is, it has a shape and a geometry) so as to allow a mixing of the basic product or finished product in the container 2.

In particular, according to a non-limiting example embodiment, the mixer unit 8 comprises mixing elements 9 configured to allow, during rotation about the mixer unit 8 about axis R, a mixing of the basic mixture or finished products in the container 2 (and possibly also a scraping of the walls 2 of the container). The machine 1 comprises a dispensing tap 13 for withdrawing the food products from the cylinder 2.

The tap 13 has a product dispensing outlet.

Figure 2:
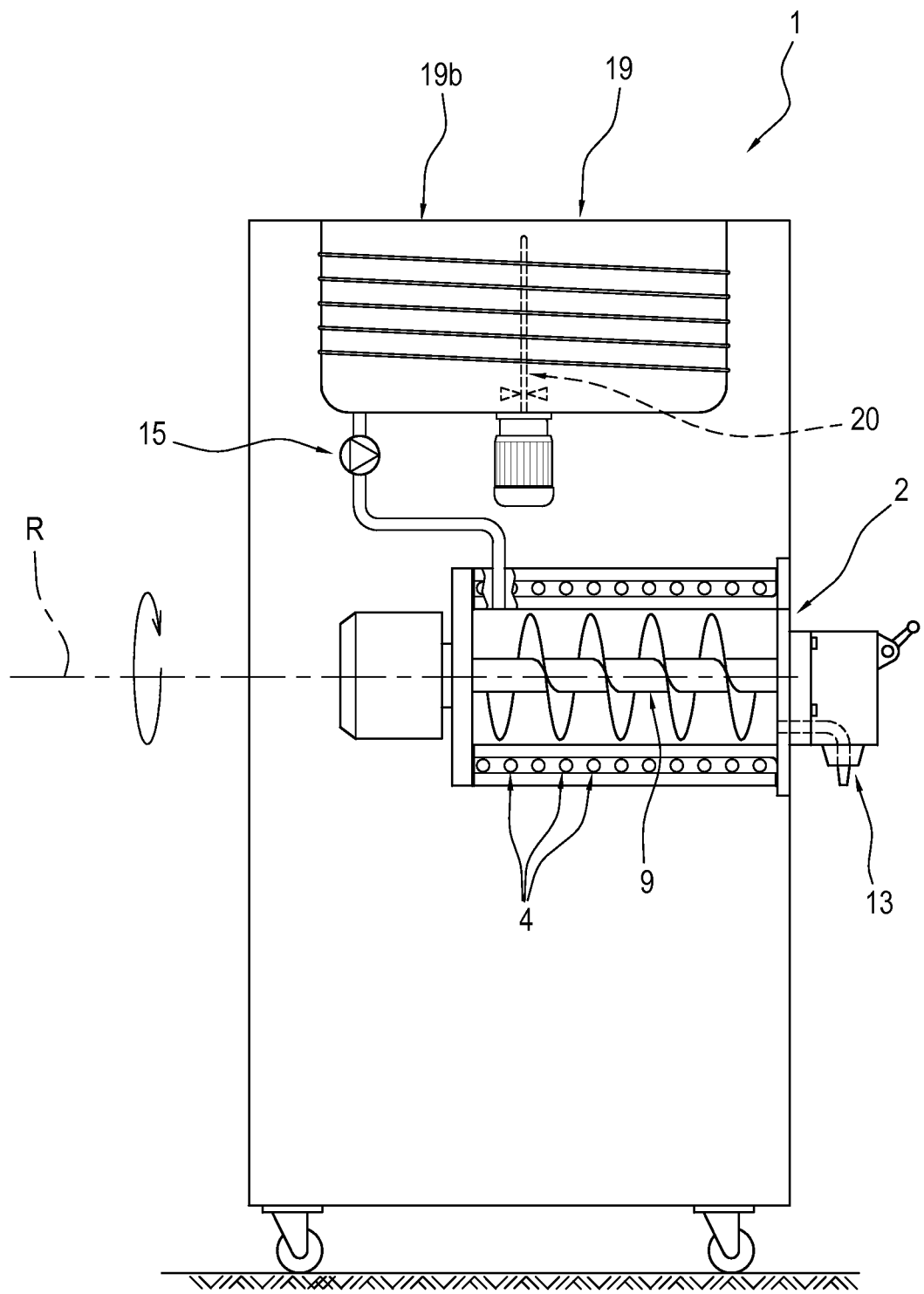

Further, the machine 1 may comprise a pump 15 for transferring the basic mixture towards the cylinder 2 (as illustrated in FIG. 2).

It should be noted that, according to an embodiment not illustrated, the machine 1 may also not comprise the pump 15 for transferring the basic mixture towards the cylinder 2. According to this embodiment, the transfer of the basic mixture towards the cylinder 2 occurs by gravity.

The machine 1 comprises at least a supply duct 10 for supplying the products into the containment and processing cylinder 2, interposed between the pump 15 and the cylinder 2.

According to the method, as will be described in more detail below, there is at least a dispensing duct 11 for withdrawing the food products from the cylinder 2.

The machine 1 also comprises a removable container 19 for feeding basic products, provided with a product outfeed channel.

The container 19 is preferably a container of the "bag in box" type 19a, that is to say, a container intended to modify its volume as a function of the quantity of product inside it (as illustrated in FIG. 1).

Alternatively, the machine 1 comprises a container 19 for feeding the basic products of the tank type 19b (as illustrated in FIG. 2), equipped with respective closing body and having a predetermined and constant volume for containing the basic mixture.

The method for cleaning a machine 1 for liquid or semi-liquid food products, according to the invention, comprises, in combination, the following steps (which are described individually in more detail below):

a) pasteurizing the basic mixture or finished product in the container (2) at each predetermined first time interval ("time interval X");

b) performing the following sequence of operations at each predetermined second time interval ("time interval Y");

emptying the basic mixture contained in the first container 2;

washing the first container 2 using a washing fluid;

at least partly filling the first container 2 with a cleaning fluid and subjecting the cleaning fluid in the first container 2 to a heating thermal treatment.

c) disassembling and cleaning at each predetermined third time interval ("time interval Z") at Least part of the components of which the machine (1) consists and which are intended to make contact, in use, with the basic mixture or with the product.

It should be noted that the steps a), b) and c) may be performed in succession.

According to a non-limiting example embodiment of the method, the pasteurization step a) is performed by an extraction from, and re-introduction in, the container 2 of the basic mixture or finished product, thereby establishing a recirculation of the basic mixture or finished product in the container 2.

In practice, according to that embodiment, a so-called "recirculation" pasteurization is implemented.

It should be noted that, according to another embodiment of the method, the pasteurizing step a) is performed by pasteurizing the basic mixture or finished product keeping the basic mixture or finished product inside the respective container 2 (without extracting it from, and re-introducing it in, the container 2, that is, in the absence of recirculation).

According to the invention, it should be noted that the first time interval X is less than the second time interval Y and the second time interval Y is less than to the third time interval Z.

With reference to step a), preferably the predetermined first me interval is less than 30 hours.

Still more preferably, the predetermined first time interval is between 20 and 30 hours (more preferably between 22 and 25 hours).

It should also be noted that, according to a non-limiting example embodiment of the method, in the step a) wherein pasteurization is performed by recirculation, the steps of extracting and re-introducing the basic mixture or finished product are performed continuously, by activating the pump 15 so as to recirculate the basic mixture or finished product along a closed path including the container 2.

In this way, advantageously, a recirculation pasteurization is substantially performed, that is to say, a heating of the basic mixture or finished product due to the recirculation along the closed path.

Preferably, in the pasteurizing step a) (with or without recirculating system) the basic mixture or finished product is heated and maintained at a temperature of between 65° C. and 85° C., for a predetermined time.

The basic mixture or finished product is then cooled to a predetermined temperature (of approximately 4° C.), and stored at this temperature.

It should be noted that the execution of the step a) allows the bacterial charge present in the basic mixture or finished product to be reduced in a particularly effective manner.

Step a) is described in more detail below.

Preferably, the step a) comprises the following sub-steps:

a step of preparing at least a dispensing duct 11 for withdrawing the food products from the cylinder 2;

a step of withdrawing the products from the cylinder 2 through the dispensing duct 11 and a step of returning them into the cylinder 2 through the supply duct 10 (this step is illustrated in FIG. 1, where the dispensing duct 11 is indicated with a dashed line).

It should be noted that, preferably, the dispensing and the introduction of the product from and into the cylinder 2 is performed by activating the pump 15.

It should also be noted that, preferably, the pump 15 is controlled by a control unit 25.

Alternatively, the recirculation of the product in step a) can be performed by means of an external pump.

According to one aspect of step a), the step of extracting from, and introducing in, the cylinder 2 the basic mixture or the product comprises the step of dispensing the products from the cylinder 2 using the dispensing tap 13, making the products transit through the dispensing duct 11 and re-introducing them into the cylinder 2 through the supply duct 10.

In other words, according to this aspect, more generally speaking the basic or finished product is made to pass through a closed path including the cylinder 2 (the closed path is defined in part by the ducts 10 and 11) so as to heat the product.

According to an embodiment of the method, preferably there is a step of disconnecting the infeed section 21 of the pump 15 from the container 19 of the basic products and connecting the infeed section 21 of the pump 15 to the dispensing duct 11.

The continuous or intermittent recirculation mode depends on the operating mode of the pump 15 selected, that is, programmed.

During the pasteurizing in step a), a temperature of the basic product or finished product is reached of between 65° C. and 85° C.

As mentioned above, the following operations are performed in step b):

b1) emptying the basic mixture contained in the first container 2;

b2) washing the first container 2 using a washing fluid;

b3) at least partly filling the first container 2 with a cleaning fluid and subjecting the cleaning fluid in the first container 2 to a heating thermal treatment.

Preferably, the washing fluid is water.

Again, preferably, the cleaning fluid is water.

It should be noted that a cycle comprising the set of steps from b1) to b3) is carried out at a (each) second time interval ("time interval Y").

Also, advantageously, a sanitizing fluid is not used in step b), which substantially increases the food safety for the final operator (in effect, there no risk that residues of the sanitizing fluid remain in the machine).

Experimental tests have shown that it is possible to clean the machine in less than half an hour.

These tests have also shown that the quantity of washing fluid and cleaning fluid required during the above-mentioned step b) is considerably less than that of the methods of known type.

Preferably, the step b2) of washing the first container 2 with a washing fluid comprises a step of filling the first container 2 with the washing fluid.

Preferably, the step of filling the first container 2 with the washing fluid comprises a step of filling a quantity of water of between 2 and 55 liters, preferably approximately five liters.

Preferably, the step b2) comprises a step of brushing the surface of the first container 2.

Preferably, in the step b2) there is a step of activvating the mixer 4 inside the second container 3, for a predetermined time.

Furthermore, in the step b2) there is a step of emptying the washing fluid from the first container 2.

It should be noted that the operations described above, for filling the first container 2 with a washing fluid, cleaning the first container 2 and emptying the washing fluid from the first container are performed, cyclically, for a predetermined number of times (preferably, three times).

If the machine is equipped with a second container of the tank type 19b, it should be noted that the operations b1, b2 and b3 are also performed on the second container 19b.

More specifically, preferably, the operations b1, b2 and b3 are performed on the second container 19b the same time as the performance of the same operations on the first container 2 (simultaneously execution of the same operation between b1, b2 and b3 on the first container 2 and on the second container 19b).

It should also be noted that, in the machine of FIG. 2 (where there is the pump 15), preferably, in the step b2) there is a step of activating the pump 15 for transferring the product between the two containers (2, 3), for a predetermined time.

Also, preferably, in the step b2) there is a step of activating the mixer 8, to allow a better cleaning of the container 2.

According to the method, the step b3) of filling the first container 2 with a cleaning fluid (for example, water) and subjecting the cleaning fluid to a pasteurizing thermal treatment comprises a step of heating the water inside the first container 2.

It should be noted that the pasteurizing thermal treatment in step b3) comprises a thermal treatment of the cleaning fluid (preferably there is a heating of the cleaning fluid).

Preferably, the heating of the cleaning fluid occurs at temperature of between 60° C. and 85° C.

During the pasteurization cycle, preferably, there is a step of keeping the cleaning fluid at a predetermined temperature for a predetermined time.

Therefore, preferably, the step b3) comprises a step b31) of keeping the wager heated in the first container 2 for a predetermined time.

Again, preferably, the step b3) comprises a step b32 (preferably after the step b31) of cooling the cleaning fluid (that is, heated water) to a predetermined storage temperature (and preferably keeping the cleaning fluid at the above-mentioned predetermined temperature).

Further, in the machine of FIG. 2, the above-mentioned step b3) comprises a step b33) of activating, at predetermined time intervals and for a predetermined time, the pump 15 for transferring the product from the second container 19 to the first container 2.

Also, preferably, the step b33) comprises activating, at predetermined time intervals and for a predetermined time, the mixer 20 of the second container 19.

It should also be noted that, according to the invention, the use of sanitizing fluid is substantially avoided in step b).

Basically, step b) optimizes the cleaning, thus reducing any risks to food safety.

According to an embodiment, the predetermined second time interval is between 3 and 43 days.

Still more preferably, the predetermined second time interval is between 10 and 43 days.

With reference to step c), preferably, the third time interval ("time interval Z") is between three months and twelve months; still more preferably, the predetermined third time interval is between six months and twelve months.

It should be noted that, preferably, the step of disassembling and cleaning at each predetermined third time interval at least part of the components of which the machine consists and which are intended to make contact, in use, with the basic mixture or with the product comprises a step of disassembling and cleaning at least the mixer 8 of the container 2 (and, if present, the pump 15).

It should also be noted that, before disassembly, there is a step of completely extracting the basic mixture or the finished product from the container 2.

Preferably, in a machine 1 as illustrated in FIG. 2, that is, equipped with a tank 19b for containing the basic mixture, the step c) comprises the disassembly and cleaning at least of:

a mixer 20 of the tank 19b;
a lid of the tank 19b (not illustrated).

Moreover, preferably, a drip collection tray (not illustrated) positioned beneath the dispenser 13, to collect the drops of product released by dispenser 13, is disassembled.

Clearly, the above is described purely by way of a non-limiting example, since it is also possible to remove and clean other components during that step.

On the other hand, with reference to the machine 1 of FIG. 1, preferably step c) comprises the disassembling and cleaning at least of the mixer 8 and the pump 15. Clearly, the above is described purely by way of a non-limiting example, since it is also possible to remove and clean other components during that step.

Moreover, preferably, the condensation collection tray beneath dispenser 13 not illustrated) and the hoses connected to the pump 15, for the transfer of the basic mixture towards the container 2, are disassembled and cleaned.

Advantageously, it should be noted that the method described above, with the sequence of steps a), b) and c), allows the machine 1 to be cleaned in a particularly thorough and effective manner and at the same time enables the downtime of the machine to be reduced. In effect, the machine 1 is disassembled just a few times each year; on the other hand, the regular performance of the steps a) and b) guarantees the food safety of the product and ensures that the machine 1 is always in perfect hygiene conditions.

It should be noted that, advantageously, the method according to the invention is applicable to a plurality of machines 1 for liquid or semi-liquid products which are different to each other, allowing a cleaning cycle to be easily performed which guarantees excellent reliability from the hygiene point of view.

What is claimed is:

1. A method for cleaning a machine for liquid or semi-liquid food products, comprising:
    providing the machine with a container forming a processing chamber for converting a basic mixture into a finished product;
    providing the container with a rotatable mixer inside the processing chamber;
    providing the machine with:
        a supply duct directly connected to the processing chamber for supplying the basic mixture or finished product to the processing chamber;
        a dispensing tap connected to the processing chamber and selectively openable to form a path from the processing chamber to an exterior of the machine for withdrawing the basic mixture or the finished product from the processing chamber to the exterior of the machine;
        a dispensing duct connected between the processing chamber, through the dispensing tap, and the supply duct for withdrawing the basic mixture or the finished product from the processing chamber through the dispensing tap and introducing the basic mixture or the finished product to the supply duct to create a closed recirculation path through the supply duct, processing chamber, dispensing tap and dispensing duct;

a) pasteurizing the basic mixture or the finished product by heating the basic mixture or the finished product to a pasteurizing temperature at a predetermined first time interval;

b) performing a sequence of operations at a predetermined second time interval as follows:
  emptying the basic mixture contained in the processing chamber;
  washing the processing chamber using a washing fluid;
  at least partly filling the processing chamber with a cleaning fluid and subjecting the cleaning fluid in the processing chamber to a heating thermal treatment;

c) disassembling and cleaning at a predetermined third time interval at least some components of the machine which make contact, in use, with the basic mixture or the finished product, performing the pasteurizing by extracting the basic mixture or the finished product from the processing chamber through the dispensing tap and the dispensing duct and reintroducing the basic mixture or the finished product into the processing chamber through the supply duct, thereby establishing a recirculation of the basic mixture or the finished product in the processing chamber through the closed recirculation path;

causing the heating of the basic mixture or the finished product to the pasteurizing temperature for the pasteurizing of the basic mixture or the finished product by the recirculation of the basic mixture or the finished product through the closed recirculation path;

wherein the rotatable mixer has a rotation axis establishing a longitudinal direction of the processing chamber;

wherein the supply duct is connected to the processing chamber at a first longitudinal end of the processing chamber for supplying the basic mixture or finished product to the first longitudinal end of the processing chamber, wherein the dispensing tap is connected to the processing chamber at a second longitudinal end of the processing chamber opposite the first longitudinal end for withdrawing the basic mixture or the finished product from the processing chamber at the second longitudinal end;

rotating the mixer to move the basic mixture or finished product through the processing chamber from the first longitudinal end to the second longitudinal end and the dispensing tap;

wherein the extraction and reintroduction of the basic mixture or the finished product in the pasteurizing step a) are performed continuously, by activating a pump to cause recirculation of said basic mixture or finished product contained in the processing chamber through the closed recirculation path;

wherein the pump is interposed between the dispensing duct and the supply duct;

providing the machine with a container for the basic mixture;

connecting the container for the basic mixture to an infeed section of the pump and feeding the basic mixture to the processing chamber through the pump and supply duct;

disconnecting the infeed section of the pump from the container for the basic mixture and connecting the infeed section of the pump to the dispensing duct.

2. The cleaning method according to claim 1, wherein the predetermined first time interval is between 20 and 30 hours.

3. The cleaning method according to claim 1, wherein the disassembling and cleaning at the predetermined third time interval comprises a step of disassembling and cleaning the mixer.

4. The cleaning method according to claim 1, wherein the predetermined third time interval is between six months and twelve months.

5. The cleaning method according to claim 1, wherein the predetermined second time interval is between 3 and 43 days.

6. The cleaning method according to claim 1,
  where the first time interval is less than the second time interval and the second time interval is less than the third time interval;
  wherein the predetermined first time interval is less than 30 hours;
  wherein the predetermined third time interval is between three months and twelve months.

7. The cleaning method according to claim 1,
  wherein the dispensing tap includes a product dispensing outlet positioned in the path from the processing chamber to the exterior of the machine, and the basic mixture or the finished product is withdrawn from the processing chamber to the exterior of the machine through the product dispensing outlet;
  wherein the dispensing duct is connected to the dispensing tap to withdraw the basic mixture or the finished product from the processing chamber through the product dispensing outlet.

* * * * *